(12) United States Patent
Singh et al.

(10) Patent No.: US 10,043,091 B2
(45) Date of Patent: Aug. 7, 2018

(54) VEHICLE VISION SYSTEM WITH RETROREFLECTOR PATTERN RECOGNITION

(71) Applicant: MAGNA ELECTRONICS INC., Auburn Hills, MI (US)

(72) Inventors: Harjeet Singh, Aschaffenburg (DE); Manuel Edo-Ros, Kleinostheim (DE); Ruediger Boegel, Grossostheim (DE); Martin Solar, Erlenbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 250 days.

(21) Appl. No.: 14/957,707

(22) Filed: Dec. 3, 2015

(65) Prior Publication Data

US 2016/0162747 A1 Jun. 9, 2016

Related U.S. Application Data

(60) Provisional application No. 62/131,518, filed on Mar. 11, 2015, provisional application No. 62/088,129, filed on Dec. 5, 2014.

(51) Int. Cl.
*G06K 9/32* (2006.01)
*G06K 9/20* (2006.01)
*G06K 9/00* (2006.01)

(52) U.S. Cl.
CPC ....... *G06K 9/3241* (2013.01); *G06K 9/00335* (2013.01); *G06K 9/00362* (2013.01);
(Continued)

(58) Field of Classification Search
CPC .. H04N 19/513; H04N 19/593; H04N 19/176; H04N 19/597; H04N 19/503; H04N 19/52; H04N 19/521
See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

DE 102013200381 7/2014

OTHER PUBLICATIONS https://web.archive.org/web/20130429130846/https://en.wikipedia.org/wiki/Retroreflector.*

*Primary Examiner* — Tung Vo
*Assistant Examiner* — Joseph Becker
(74) *Attorney, Agent, or Firm* — Honigman Miller Schwartz and Cohn, LLP

(57) ABSTRACT

A vision system of a vehicle includes a camera and an image processor. The camera is configured to be disposed at a vehicle so as to have a field of view exterior of the vehicle. The image processor is operable to process image data captured by the camera to classify patterns of retroreflective reflectors present in the field of view of the camera. The image processor compares determined patterns of retroreflective reflectors to a database of patterns and classifies patterns of retroreflective reflectors at least in part responsive to determination that determined patterns of retroreflective reflectors generally match a pattern of the database. The image processor may compare movement of determined patterns of retroreflective reflectors and pattern movements of the database over multiple frames of captured image data and may classify the retroreflective reflectors at least in part responsive to determination that the movements generally match.

18 Claims, 22 Drawing Sheets

(52) U.S. Cl.
CPC ....... *G06K 9/2054* (2013.01); *G06K 9/00785* (2013.01); *G06K 9/00798* (2013.01); *G06K 9/00818* (2013.01)

(56) References Cited

U.S. PATENT DOCUMENTS

| | | | |
|---|---|---|---|
| 5,796,094 A | 8/1998 | Schofield et al. | |
| 5,949,331 A | 9/1999 | Schofield et al. | |
| 6,690,268 B2 | 2/2004 | Schofield et al. | |
| 6,693,517 B2 | 2/2004 | McCarthy et al. | |
| 7,038,577 B2 | 5/2006 | Pawlicki et al. | |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 9,146,898 B2 | 9/2015 | Ihlenburg et al. | |
| 2002/0176605 A1 | 11/2002 | Stafsudd et al. | |
| 2004/0211837 A1* | 10/2004 | Eisenberg | G02B 5/124 235/462.41 |
| 2005/0152581 A1 | 7/2005 | Hoki et al. | |
| 2007/0221822 A1 | 9/2007 | Stein et al. | |
| 2007/0253597 A1 | 11/2007 | Utida et al. | |
| 2008/0043099 A1 | 2/2008 | Stein et al. | |
| 2010/0253594 A1* | 10/2010 | Szczerba | G01S 13/723 345/7 |
| 2012/0062743 A1 | 3/2012 | Lynam et al. | |
| 2012/0218412 A1 | 8/2012 | Dellantoni et al. | |
| 2013/0002873 A1 | 1/2013 | Hess | |
| 2013/0222592 A1 | 8/2013 | Gieseke et al. | |
| 2014/0067206 A1 | 3/2014 | Pflug | |
| 2014/0159925 A1* | 6/2014 | Mimeault | G01S 17/58 340/935 |
| 2014/0218529 A1 | 8/2014 | Mahmoud et al. | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0344028 A1 | 12/2015 | Gieseke et al. | |
| 2015/0352953 A1 | 12/2015 | Koravadi | |
| 2016/0036917 A1 | 2/2016 | Koravadi et al. | |
| 2016/0075332 A1 | 3/2016 | Edo-Ros | |
| 2016/0210853 A1 | 7/2016 | Koravadi | |
| 2017/0083774 A1 | 3/2017 | Solar et al. | |
| 2017/0169301 A1 | 6/2017 | Kunze | |

\* cited by examiner

VEHICLE VISION SYSTEM WITH RETROREFLECTOR PATTERN RECOGNITION

CROSS REFERENCE TO RELATED APPLICATIONS

The present application claims the filing benefits of U.S. provisional applications, Ser. No. 62/131,528, filed Mar. 11, 2015 and Ser. No. 62/088,129, filed Dec. 5, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides identification of passive light sources, such as reflections of light, in the field of view of the camera or cameras.

The vision system of the present invention includes a camera disposed at a vehicle and having a field of view exterior of the vehicle and an image processor operable to process image data captured by the camera. The image processor is operable to process captured image data to classify passive light sources or retroreflective reflectors present in the field of view of the camera. The image processor compares determined patterns of retroreflective reflectors to a database of patterns and classifies the retroreflective reflectors at least in part responsive to determination that determined pattern of retroreflective reflectors generally match a pattern of the database.

Optionally, the image processor may compare movement of determined retroreflective reflectors over multiple frames of captured image data to pattern movements stored in the database and may then classify or identify the retroreflective reflectors at least in part responsive to determination that the movement of the determined retroreflective reflectors generally matches the pattern movement of the database. For example, the image processor may be operable to determine that determined retroreflective reflectors are reflectors on tires or wheels of a moving bicycle.

Optionally, the database of patterns may include selected patterns of reflectors on items. For example, the selected patterns of reflectors may comprise at least one of (i) a pattern of reflectors on an article carried by a pedestrian (such as a pattern of reflectors on a satchel or backpack or purse or the like) and (ii) a pattern of reflectors on an article worn by a pedestrian (such as a pattern of reflectors on a vest or jacket or shoes or the like).

These and other objects, advantages, purposes and features of the present invention will become apparent upon review of the following specification in conjunction with the drawings.

BRIEF DESCRIPTION OF THE DRAWINGS

FIG. 2A is an image of a night time road scene ahead of a vehicle equipped with the vision system;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
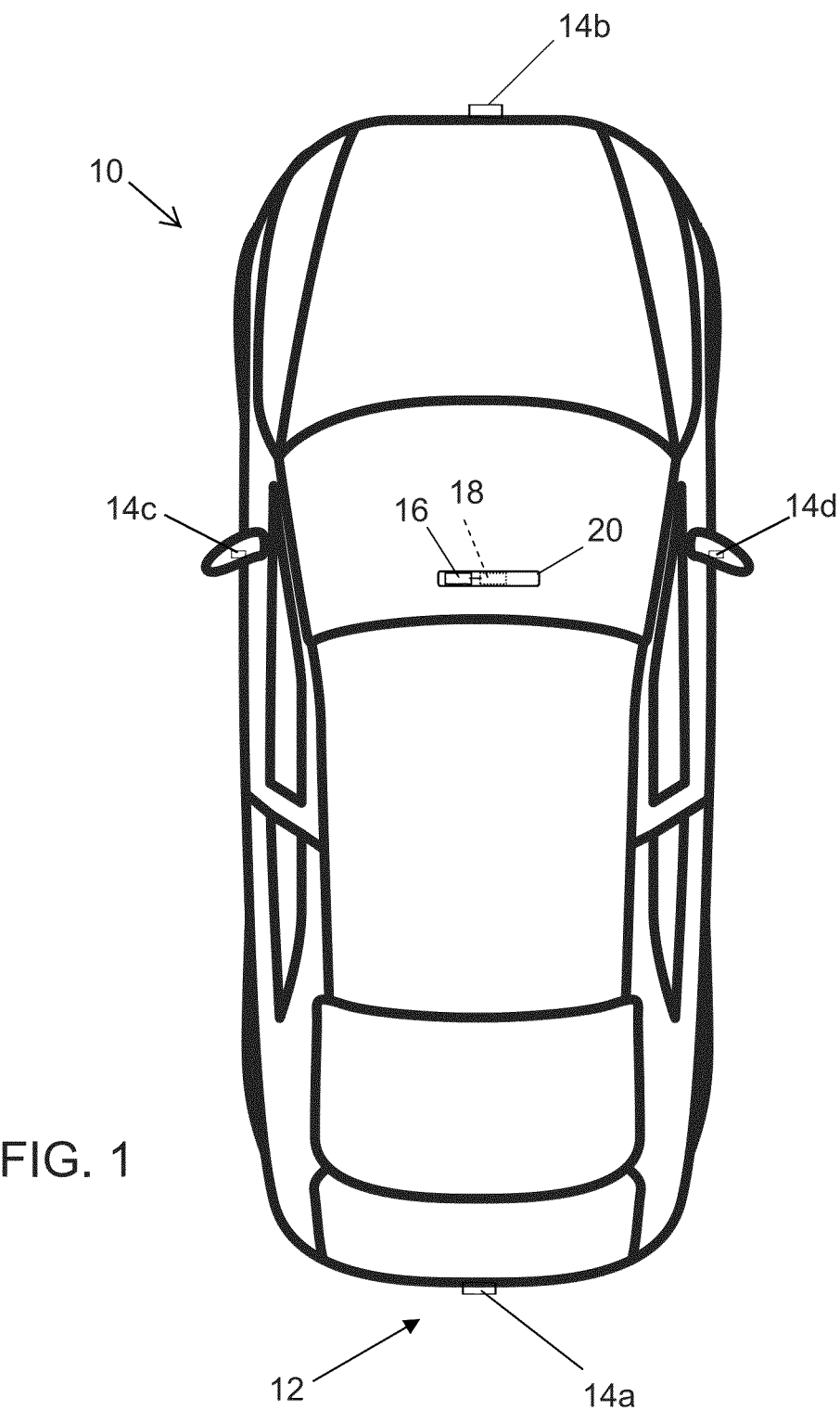
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, a forward vision system utilizes a camera and in image processor for processing image data captured by the camera. During operation, the forward viewing camera's image data streams are fed into the image processor or processing chip or the like. The image processor processes the captured image data and outputs the relative position of the equipped or host or subject vehicle to an obstacle detected in the field of view of the camera, traffic signs, light sources and/or the like.

The image processor does not report non-active light sources, such as reflections or the like, especially reflectors, with the exception of non-actively illuminated traffic signs and reflections of lane markings. Active light sources include, for example, traffic lights, vehicle head lights, vehicle rear lights, construction site lights, street lights and/or the like.

The vehicle forward vision system of the present invention may incorporate the processing and detection and classification/clustering of non-active or passive light sources or reflectors, such as reflection on the road surface, surfaces on obstacles, traffic participants, buildings or other buildings or dedicated reflectors, such as reflectors on delineators (reflector posts), reflectors on bicycles, tricycles, rickshaws, scooters, quarts, rollerblades, skate boards, longboards, kids toys (such as Bobby-Cars™ or the like) or reflectors worn, incorporated or attached to clothing of animals (dogs, horses, etc.) or humans, such as shoes, socks, jackets, pants, helmets, glasses, umbrellas, bags, satchels, seats, cellphones, decorative elements, backpacks or students' satchels or the like.

As used herein, passive light sources or reflectors or non-active reflectors or retroreflective reflectors comprise reflectors having specific patterns provided by the reflectors, which reflect light back toward the light source along the same optical path or light direction, with minimal scattering of light. Such retroreflectors may comprise reflective stickers or materials or the like disposed in a predetermined or selected pattern on the clothing or carried item or other object or the like. The pattern of retroreflectors on the object is within the forward field of illumination of the equipped vehicle's headlights (or other light source of the vehicle), when the headlight (or other light source) is projecting a forward beam of visible light and/or near infrared illumination, and is within the field of view of the forward viewing camera. The image data captured by the camera (that includes data representative of the pattern of retroreflectors) is processed by an image processor to determine and classify the retroreflected pattern and thus to effectively identify or classify the object having the pattern of retroreflectors disposed thereon.

The retroreflectors may be configured to retroreflect infrared or near infrared light back toward an infrared or near infrared light source at the vehicle, whereby an infrared or near infrared light sensitive camera or sensor (disposed at or near the infrared or near infrared light source) may capture image data representative of the retroreflector pattern. The retroreflector may reflect such infrared or near infrared light while not retroreflecting visible light and thus the retroreflector pattern is not readily visible to the driver of the vehicle. Optionally, the light source and pattern of retroreflectors may be spectrally tuned so that the spectral band of light emitted by the light source is retroreflected by the retroreflectors, while other spectral bands of light (such as light emitted by the vehicle headlights or other light sources) is not retroreflected.

Reflectors are typically well conceivable in comparison to non-specifically reflecting surfaces at the same light conditions. Especially at low light conditions, reflectors are well known by vehicle drivers as being sufficient to ease the conception of road topography, obstacles and road participants. The machine vision system of the present invention may also take advantage of these omnipresent road hints.

Figure 2B:
FIG. 2B is another image of the night time road scene of FIG. 2A, showing lane markings as they may be detected by a vision system with lane detection.
Figure 2C:
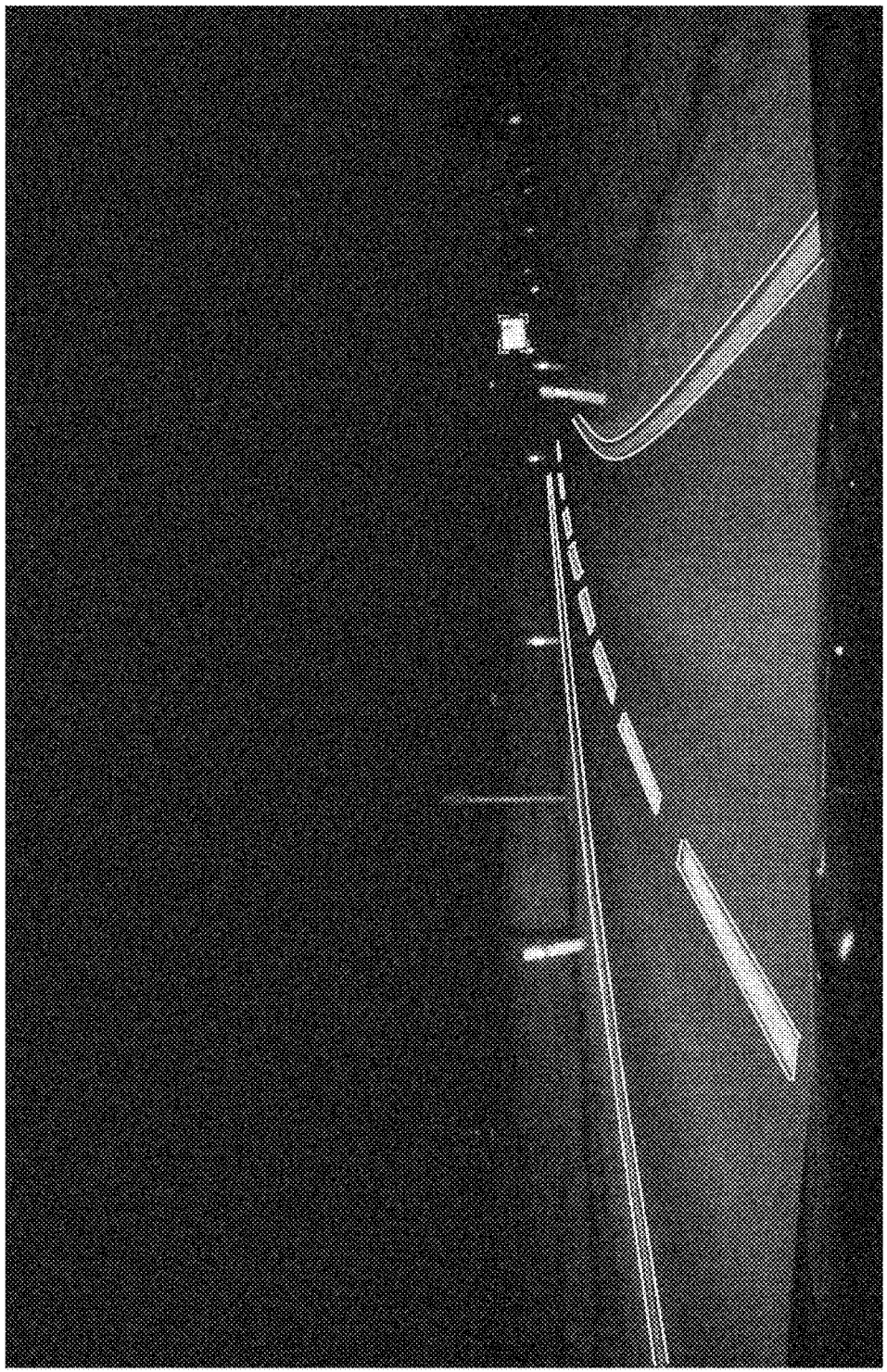
FIG. 2C is another image of the night time road scene of FIG. 2A, showing traffic signs as they may be detected by a vision system with traffic sign recognition.

A night time road scene is shown in FIG. 2A. Conventional systems may be able to extract the road markings by vision computing, especially edge detection algorithm such as a Sobel filter or the like. This is possible as far as the markings are in view and illuminated by the vehicle's head lamps or other ambient lights, such as shown in FIG. 2B, in case no additional costly advanced detection systems come in use such as rest illumination intensifier (high light sensitive imager or photon collector), near infrared illumination and cameras, far infrared cameras or other types of night vision systems. Such advanced detection systems may optionally be incorporated into the system of the present invention when present as well as using ADA-system's controlled high beams, such as by utilizing aspects of the systems described in U.S. provisional Ser. No. 62/222,268, filed Sep. 23, 2015, which is hereby incorporated herein by reference in its entirety, but the system of the present invention may function without any of these advanced systems. Conventional systems typically additionally detect traffic signs such as shown in FIG. 2C, although conventional traffic signs passively reflect light (retro-reflected, with minimum scattering of light). For example, the image processing EyeQ2 or EyeQ3 chips (of Mobileye Vision Technologies Ltd. of Jerusalem, Israel) provide traffic sign detection. The traffic sign detection is typically for detecting its meaning, typically by classifying its shape, plausible size, letter type and texture. The traffic sign posts or pole or poles footpoint or footpoints position stays disregarded for determining the consecutive proceeding of the road or lane or its boundaries.

An advanced road path prediction system of the present invention may combine the information of the lane detection with the information regarding the position of detected road signs of a road sign detection algorithm. Under regard of some exceptions it is plausible to assume that the road path cannot continue underneath road signs. The system may assume that these are positioned beside the road, often close to the drivable pathway. The system may assume that the vehicle pathway or road routes through the space between the road signs. Outside of city limits, the road typically follows a limited curvature radius, and such curves typically have shapes for best drivability.

By nature the road sign's elevation follows the terrain's topography. Traffic signs are typically positioned between 1 m and 4 m off the ground. Exceptions are given by traffic signs hanging over the street or lane mounted on crane or bridge like post structures. Under regard of these assumptions, the system of the present invention is able to postulate the extrapolation of the further proceeding (vertically and laterally) of a lane or road beyond its visible lane markings.

Figure 2D:
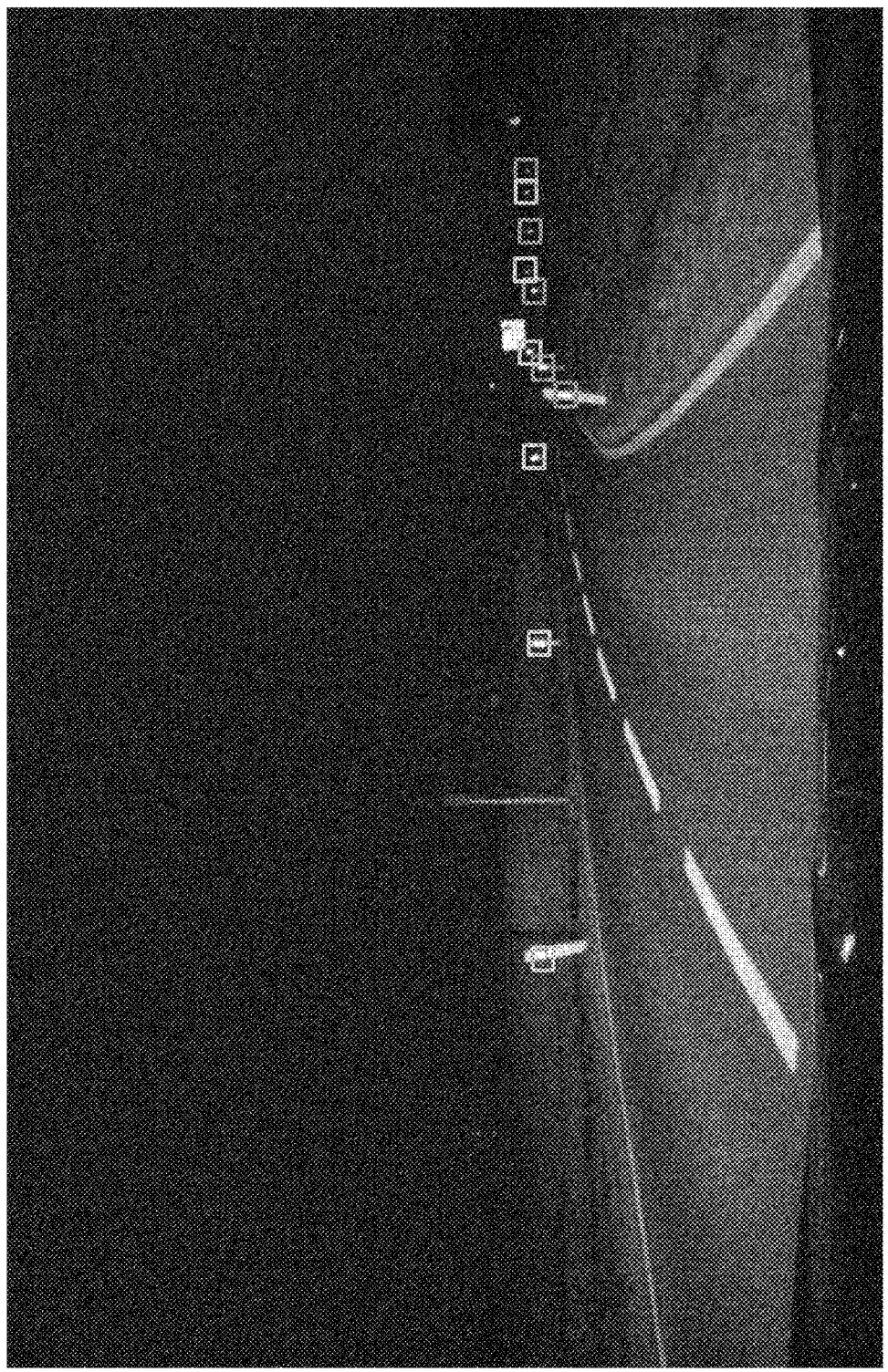
FIG. 2D is another image of the night time road scene of FIG. 2A, showing reflector posts as they may be detected by the vision system of the present invention.

A further advanced system may also take reflecting light sources in account, especially reflector posts. In FIG. 2D, the light reflection of reflector posts are highlighted. The reflector post's reflection is still present in areas at which the road or lane markings are not visible any more. Similar to traffic signs, the system may assume the reflector posts are always close to the side of the road (such as, for example, in Germany, such posts are about 50 cm from the road side), typically at a specific height (measured relative to the road surface), have a specific size, shape and reflector color. Additionally usable for post reflector distinction (clustering/classification) is that in most countries the reflector posts have defined distances to another along the road (such as, for example, in Germany, such posts are spaced about 50 m apart), and in some countries the spacings are depending on the road type (for example, the reflector post distances apart on Highways may be different to that on overland roads).

Figure 2E:
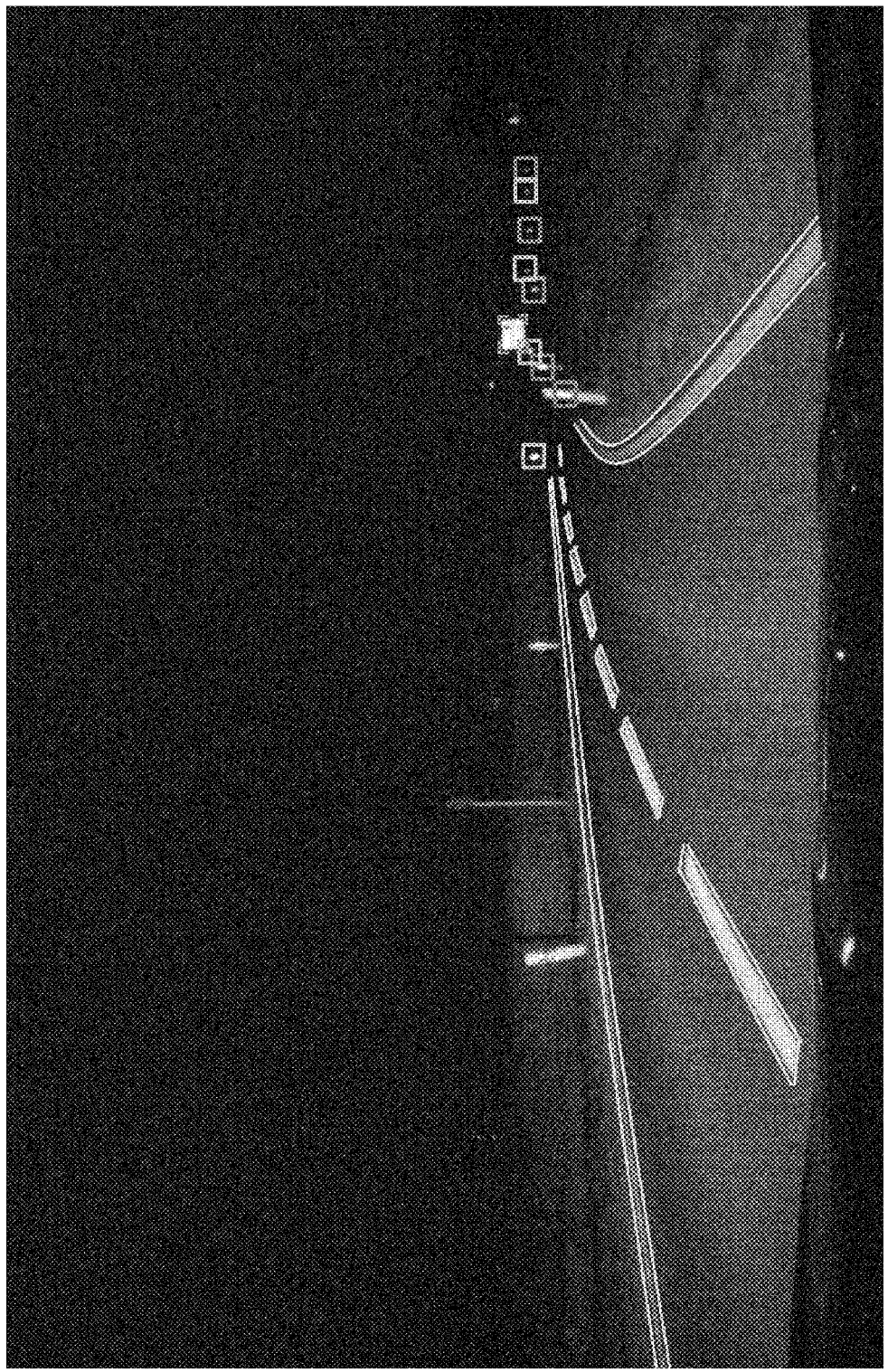
FIG. 2E is another image of the night time road scene of FIG. 2A, showing a combination of objects or reflectors as they may be detected by the vision system of the present invention.
Figure 2F:
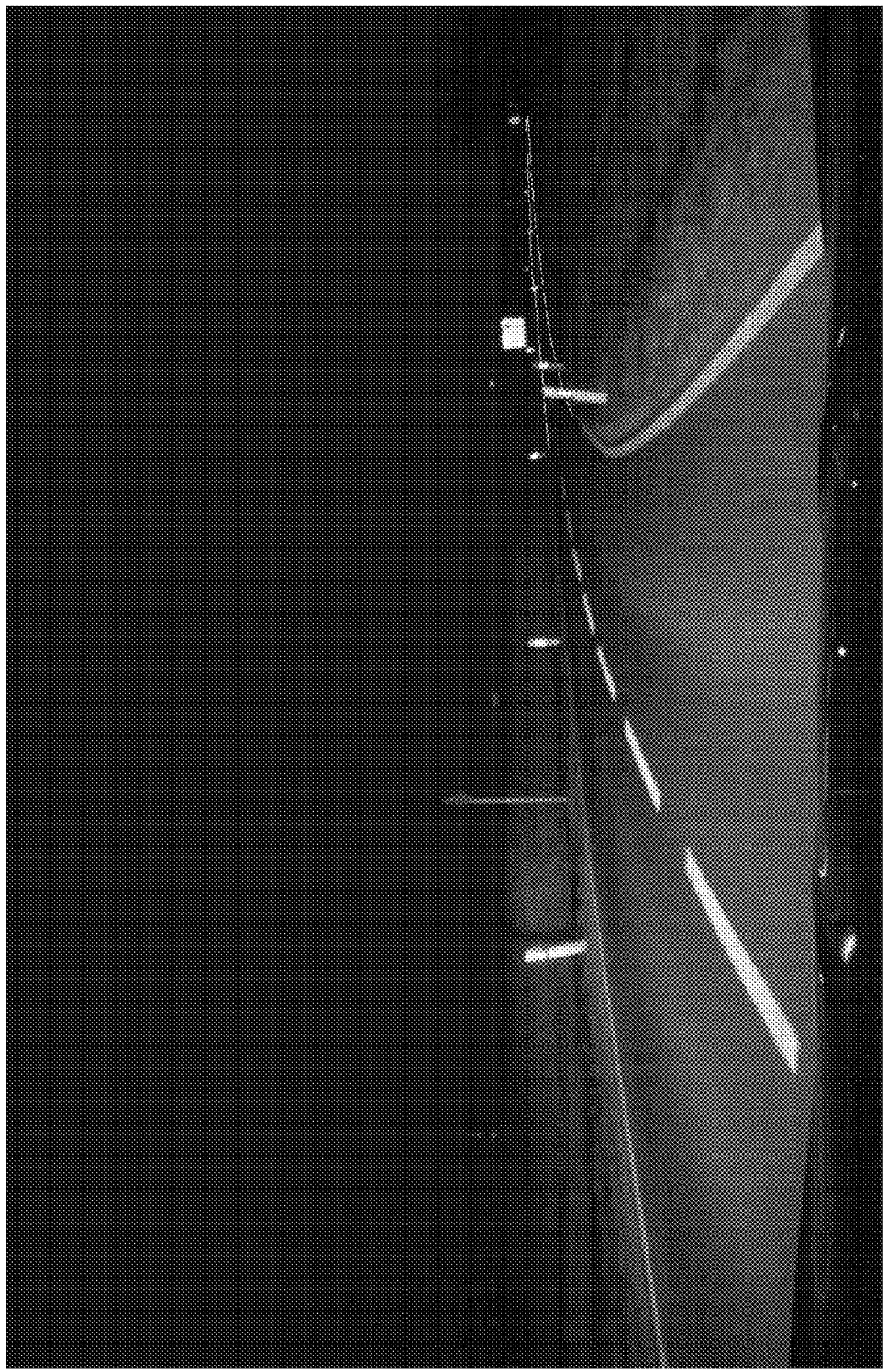
FIG. 2F is another image of the night time road scene of FIG. 2A, showing a possible path prediction overlay.
Figure 2G:
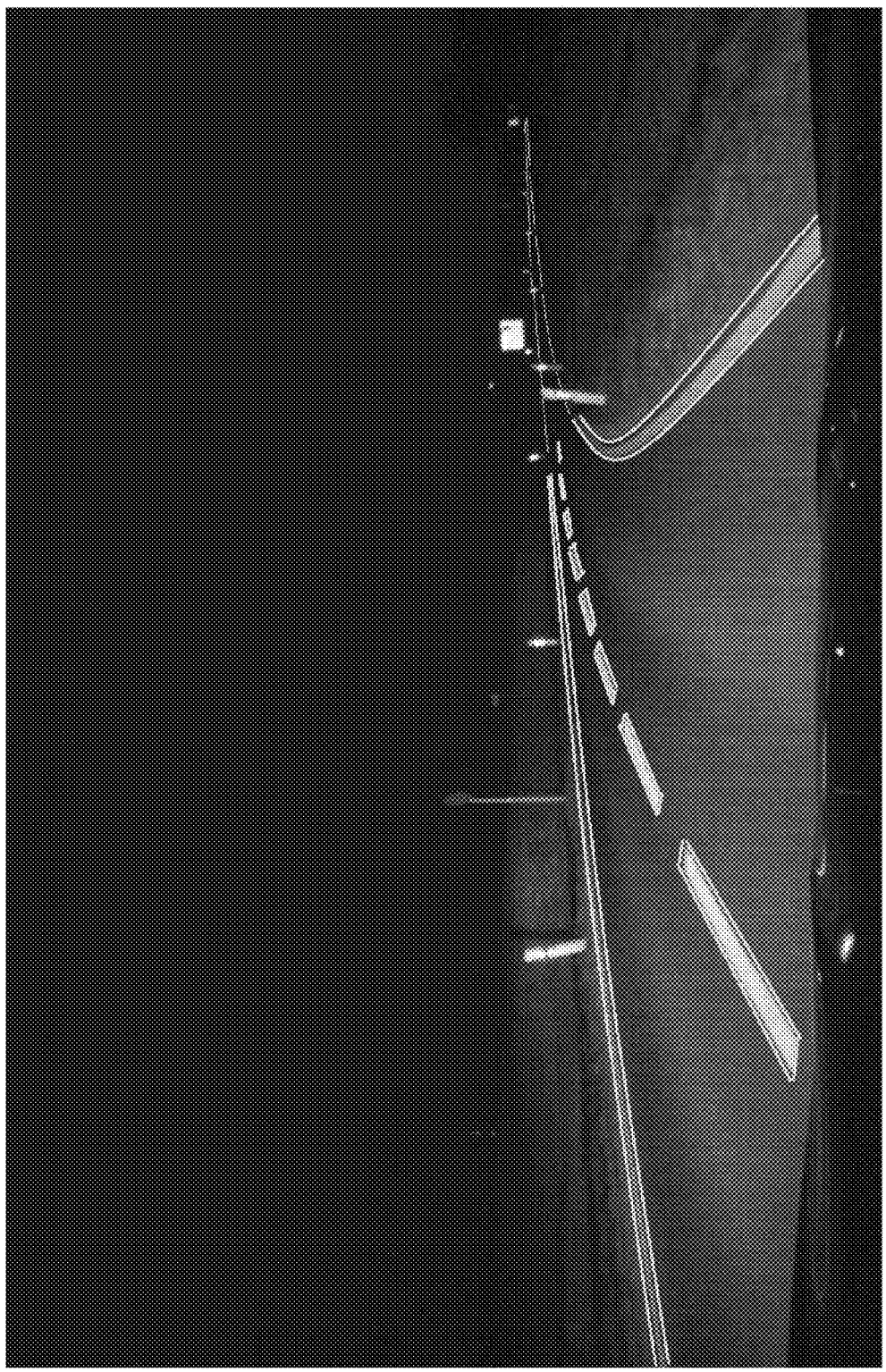
FIG. 2G is another image of the night time road scene of FIG. 2A, showing lane detection and a possible path prediction overlay.

Thus, by using information pertaining to which country the vehicle is actually traveling in, the system may be able to better predict the further or distant expected road post reflector positions and their reflections after closer road reflector posts have been detected (with the earlier post used as a beginning point for the distance prediction). Road curvature and topography may be taken into account for that prediction as discussed below (depending on the country the post distance in curves may be different from the distance on straight road sections). A region of highest probability at which a (the next) reflector (of a post) is to find may become predicted. FIG. 2E shows a possible combination of regarded light sources for predicting a further pathway, and FIG. 2F shows a possible path prediction overlay based on the image data processing of the system of the present invention. FIG. 2G shows a communized path of a possible path prediction overlay based on the system of the present invention and lane detection.

As another optional aspect of the present invention, the path propagation may be checked for plausibility by comparing the assumed road propagation with the road path from an offline map, such as a map stored in navigation systems or alternatively from an online map, which acquires the actual road path on the fly or partially pre stored and optionally pre-processed via a remote source or communication link, such as to a vehicle and infrastructure data cloud or vehicle data context server, such as by utilizing aspects of the systems described in U.S. Pat. No. 9,146,898, which is hereby incorporated herein by reference in its entirety, or from a map stored by the ego system when the system has passed the road area earlier.

As another ability of a more advanced system of the present invention, the system may be able to detect dedicated index markings or patterns. Additionally or alternatively, the dedicated color, color wavelength interval or combination of multiple colors or color wavelength intervals or combination of multiple colors or color wavelength intervals arranged in patterns may be especially detectable. The wavelength of the colors may be in a visible or invisible spectral band or spectrum. The wavelength of the color wavelength intervals may be in a visible or invisible spectrum or in a transition between visible and invisible spectrums (such as ultraviolet, near infrared or far infrared). Primitive patterns and color codings are known from road reflector posts. In Germany, for example, those on the left side have two white round reflectors and those on the right side have one white reflecting bar, and at intersections the reflectors are orange instead of white. These are made for being conceived by humans. The vision system according to the present invention may be trained to take advantage of these reflector properties as being trained to distinguish between left and right road reflector posts by being trained at both color and shape pattern. Optionally, the post's body may also be reflective enough to be considered as a passive reflective object which may be trained into or learned by the recognition system (classifier or clustering).

Figure 2H:
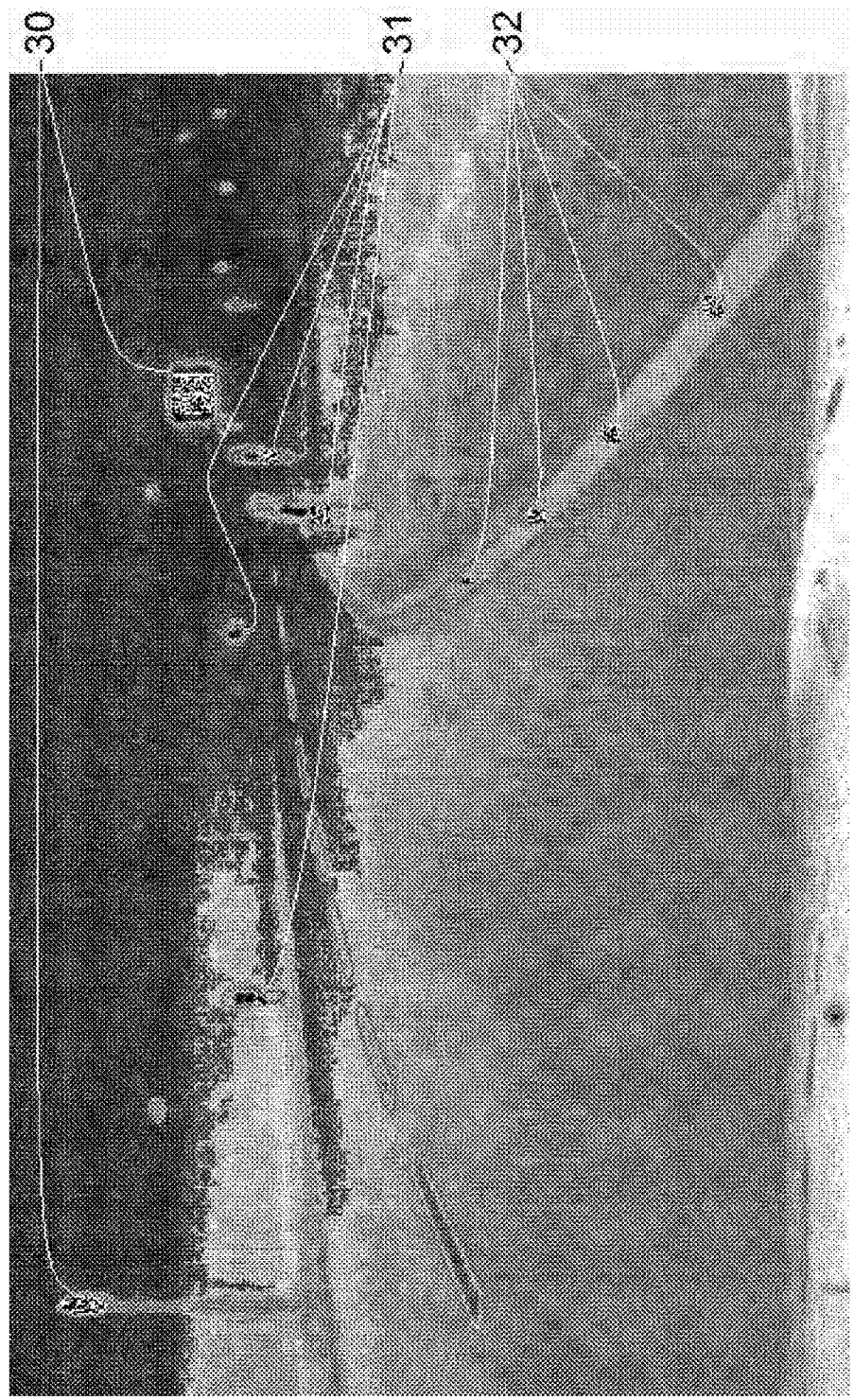
FIG. 2H is similar to the image of the night time road scene of FIG. 2A, shown as if detected by a near infrared light sensitive sensor, with the traffic signs 30, street posts 31 and lane markings 32 having a 2D (QR) dot code which has a contrast in infrared light.

As can be seen in the example of FIG. 2H, additional information may be inherent in or added to the reflective pattern of passively reflecting road objects, such as, for example, at a traffic sign 30, at road side reflector posts 31 or optionally the (painted) lane marking stripes 32, such as a bar (1D) or dot matrix (2D) visible by visual, ultraviolet or near infrared cameras which accurately indicate the actual way point of the road. This may be usable to machine vision systems to have a redundant position data. The data may be redundant or more accurate and possibly more error robust than the actual GPS position or geographical location and/or the position generated by comparing the actual road shape or general passively reflective road objects or vision cues as being one aspect of the present invention specified above or by comparing to known art GPS satellite positioning. The road path propagation as specified above may incorporate and consider the additional information for accurate positioning and furthermore, the additional information may additionally provide data on how the road is further propagating.

For example, each additional information may provide another interval of road propagation which reaches to the next reflective data pattern. There the index pattern or matrix carrying the additional information may be any kind of 1D bar code or 2D QR code. For a higher data density, a color coding may be within the QR code optionally such as by using known 2, 4, or 8 HCC2D (High Capacity Colored 2D). Optionally, one coding color or colors may be wavelengths of infrared (IR) or ultraviolet (UV), optionally mixed with visible colors. Optionally, the coding (such as the additional information in the form of a bar code or the like) may be visible only in IR or UV light (non-visible to the human eye but visible to an IR or UV sensitive camera or sensor) while the same surface (such as, for example, a traffic sign) may show a different code, different information or different type of information (such as, for example, text and/or arrows) in visible light (having wavelengths in the visible light spectrum). By that the code information may appear hidden to a human viewer, with the sign showing usual road sign content to a human observer, while showing machine vision information to the camera and vision system in IR or UV light.

Since the system is meant for enhancing night driving abilities, visual colors may tend to fade out, and by that it may be more efficient to just encode the gray tones or shading in the code. Optionally, the system may decode high prioritized information on the gray shading of the code matrix and optionally lower prioritized information on the visual or non-visual wavelengths' color (with the gray shading inherent). Optionally, any of the codings may have low autocorrelation or cross-autocorrelation. Optionally, the codings may possess parity bits, optionally across the 1D, 2D and the color dimensions. Optionally, there may be parity over consecutive additional information codings. Optionally, the lane markings may have a fully or partially continuous bar coding along the street. This may be read by encoding just the lowest rows of each (forward camera) imager frame consecutively with some overlap for calibration. Below specified are reflective index pattern worn by human or animals. The above specified coding solutions may optionally also find use in these.

Figure 3A:
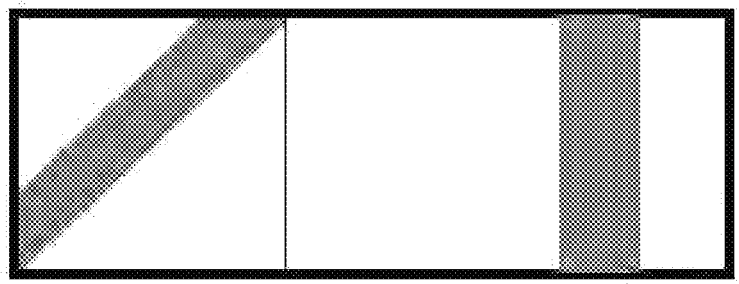
FIGS. 3A-C are patterns that may be indicative of a satchel (carried by a student or the like) that may be identified by the vision system of the present invention.
Figure 3B:
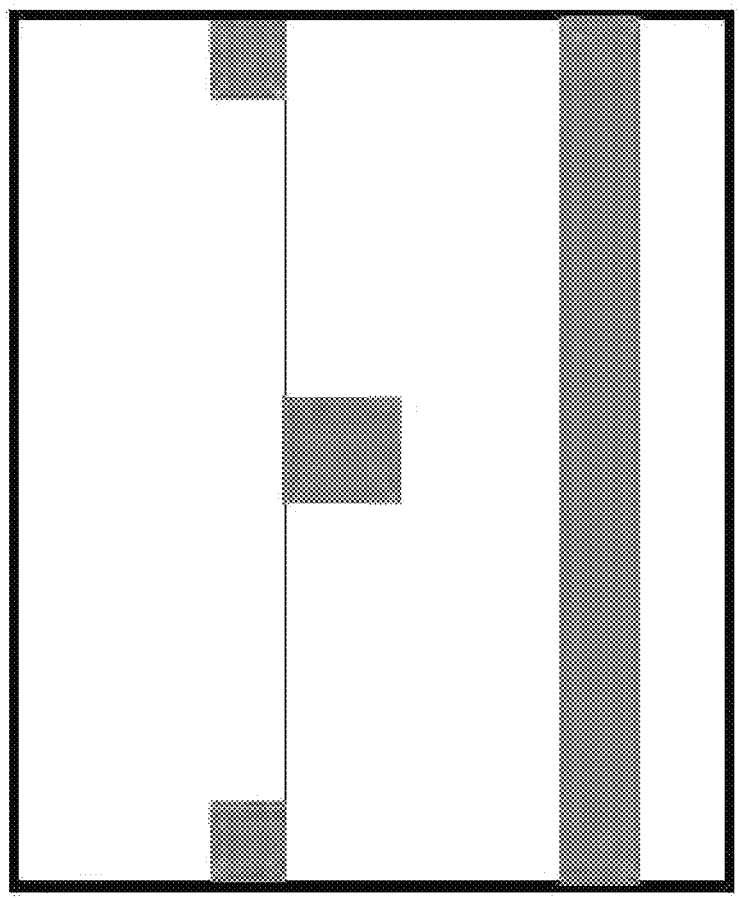
Figure 3C:
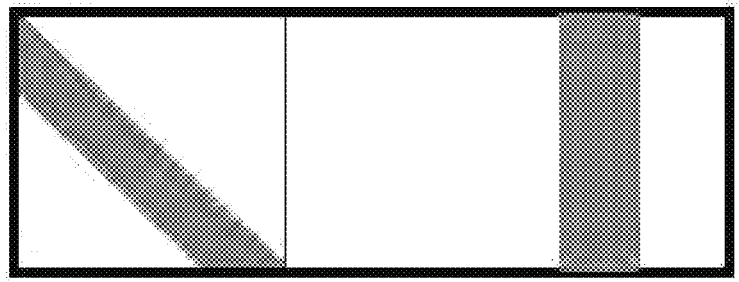

As one aspect of the present invention, there may be agreed or set or predetermined (such as by a commission or such) patterns and/or color codings and/or combination of multiple colors or color wavelength intervals arranged in patterns, which may come into use for indexing specific types of road obstacles, for enabling driver assistant (DAS) or autonomous vehicle control (AVC) systems to classify obstacles in view better and earlier for acting upon (such as collision evasion). For example, there may be a dedicated pattern that gets reflected by sets of reflectors attached to the outer surface of satchels or bags or purses or the like that may be carried by pedestrians, such as students in school areas or the like. Optionally, the pattern may vary when the satchel is seen from the side, such as can be seen in FIGS. 3A and 3C, than when seen from the rear, such as can be seen in FIG. 3B. By that a system may be enabled to highlight and warn a driver when approaching a pupil or student, such as, for example, when he or she is crossing a road at night time already, when the outline of that student is still not detectable by the general obstacle classifier but the reflectors and especially the reflector's pattern of the student's satchel or a part of the satchel's reflectors or index pattern is visible to the cameras of the DAS or AVC system. The system may be able to distinguish the approaching from the side from approaching from rear of such a student carrying or wearing such a satchel. The system's pattern recognition (classifier or clustering) of the present invention may be trained to also detect the above pattern or index marking when partially occluded (for a certain instant) or distorted due to perspective view onto partially skewed objects wearing the reflector markings, index patterns (while the outline of the object (e.g., the satchel) may not be conceivable by the system due to low lighting conditions).

In the example of FIGS. 7A-D, forward camera view images flow are shown. The vehicle without infrared illumination at which a visual camera without special night vision capability is installed is following a straight road at night time with bare ambient light. The vehicle is approaching a pedestrian or student or pupil who is wearing a satchel with a pattern of passively reflecting elements on it from rear (with FIGS. 7A-D consecutively closing to the student from FIG. 7A to FIG. 7D). The student is walking at the right roadside. The vision system may employ a processor chip, such as, for example, a Mobileye EyeQ3 image processing chip or the like, which may be made for lane detection, traffic sign recognition and pedestrian protection. Due to the darkness of the environment (such as a night scene), the system may have difficulties detecting and recognizing the student as being a pedestrian or even as being an object. As shown in FIGS. 8A-D, a hazard warning is present in the images (such as by highlighting bounding boxes or the like) when detecting a student's satchel's reflector pattern (such as the pattern as suggested in FIGS. 3A-C) in accordance with the present invention (the highlighting may be generated at a camera vision display or head up display overlay for being visible to the driver, and the machine vision algorithm may act upon the knowledge of the detected objects).

The system of the present invention may have stored or learned the special patterns (and its context information, additional content or meaning) as datasets for being checked against or compared to common patterns appearing in the camera's field of view that may be reflecting lights only without dedicated meaning. Upon detection, the system may provide warning and/or support for collision avoidance path planning for safely passing or stopping in front of endangered objects, animals or persons, such as by utilizing aspects of the systems described in U.S. Publication No. US-2014-0067206, and/or U.S. patent application Ser. No. 14/854,376, filed Sep. 15, 2015, which are hereby incorporated herein by reference in their entireties. In U.S. Publication No. US-2014-0067206, use of environmental scene data understanding for further computing in a collision avoidance and invasive steering and braking system is described.

These patterns may be established or set or agreed on between the manufacturers of the specific items (such as the manufacturers of satchels or the like) and the automotive industry, or may be set by a consortium or by law. Optionally, additional [metha-] information may be visible to the system as index patterns, optionally only visible in a wavelength or a wavelength interval that is invisible to the human eye but is visible to cameras sensitive to those wavelengths. The [metha-] information may be, for example, whether or not a horse wearing reflective elements on, for example, the legs including the index markers is, for example, insured against third party risk or, for example, whether the horse rider is a beginner or advanced rider.

Figure 4A:
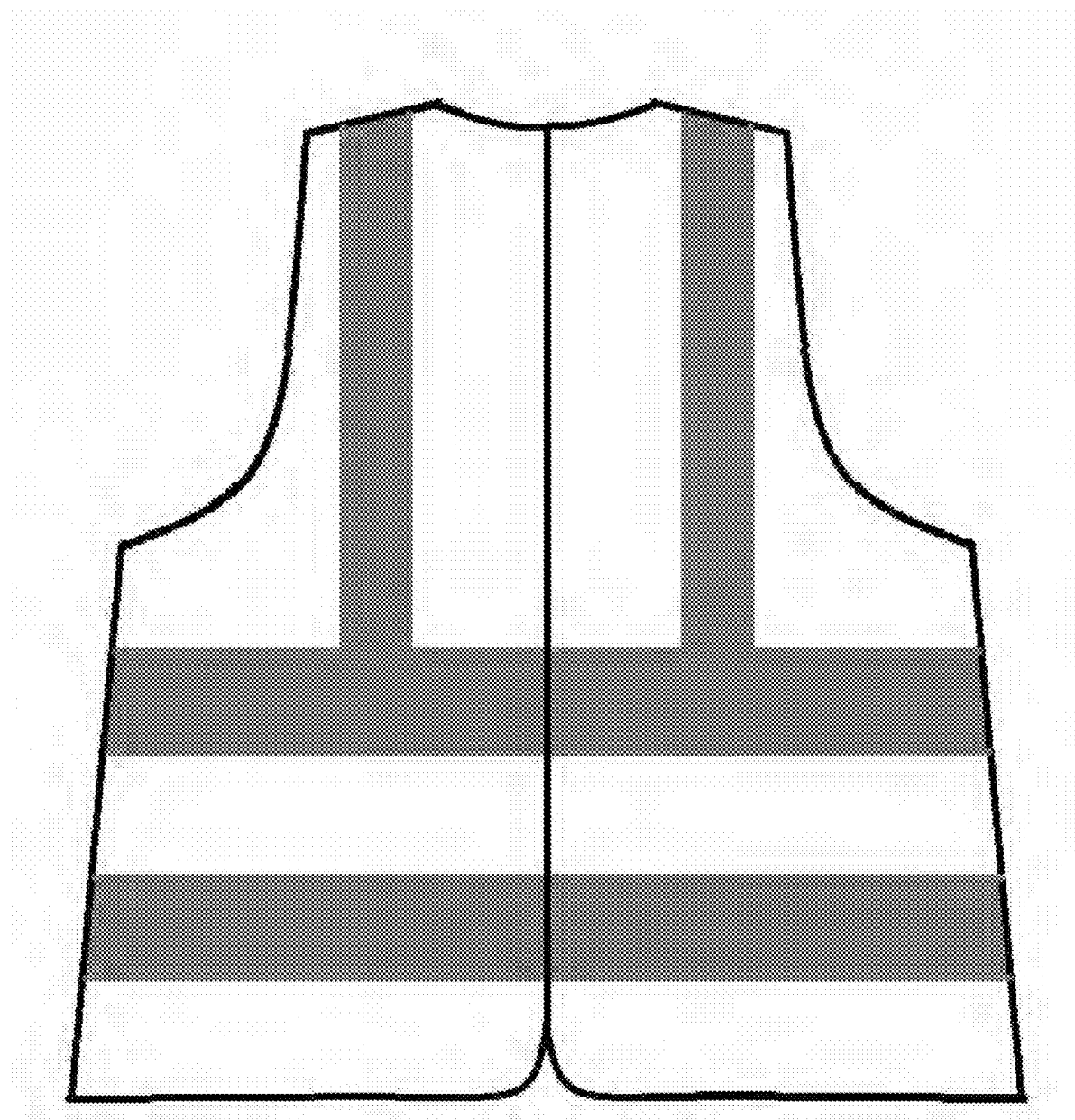
FIGS. 4A-B are patterns of reflectors on a reflective vest that may be identified by the vision system of the present invention, with FIG. 4A showing the pattern as seen from the front and FIG. 4B showing the pattern as seen from the rear.
Figure 4B:
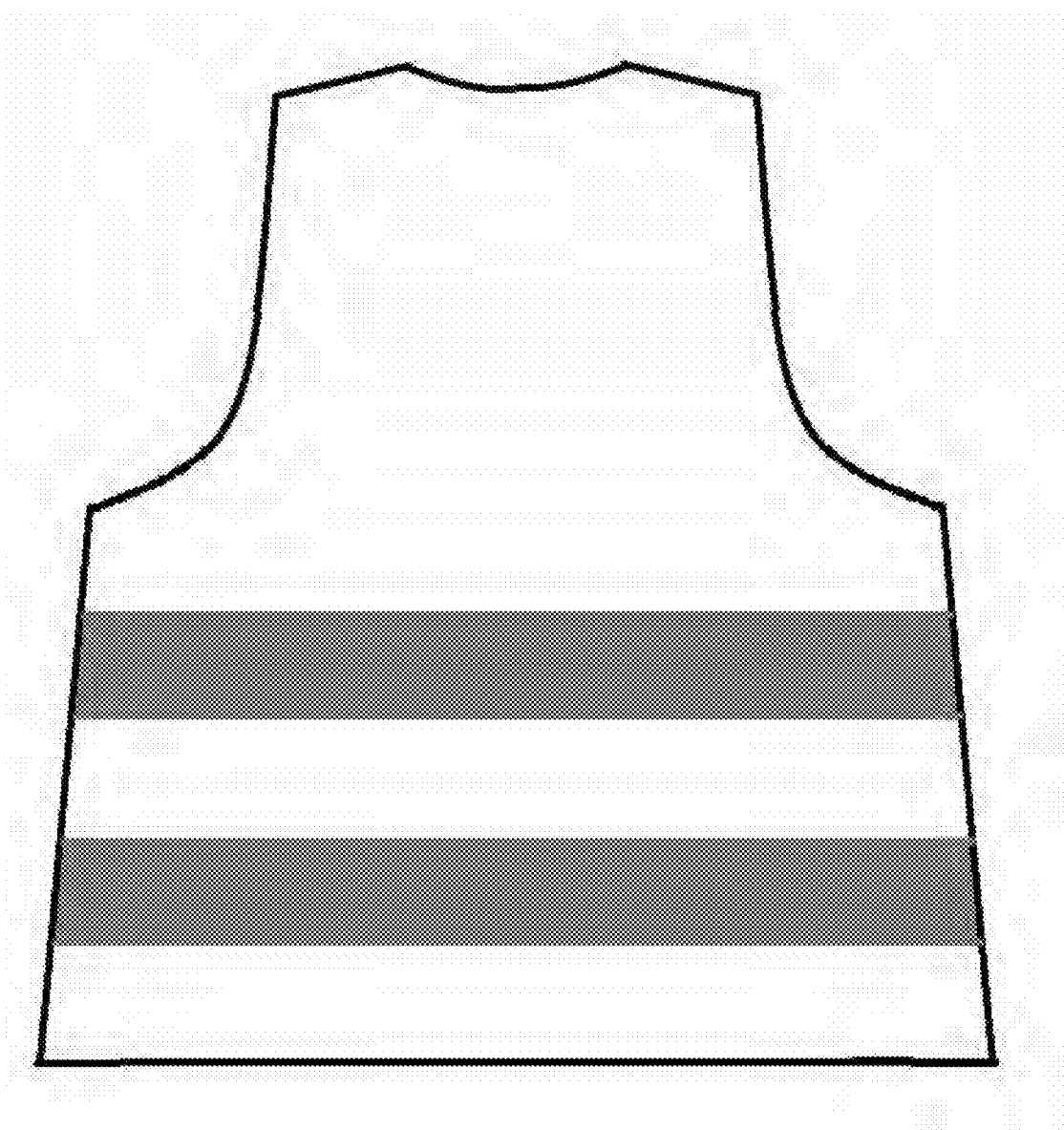

Additionally or alternatively, the system of the present invention may learn or store patterns which already exist in common products, especially these which use reflectors. For example, reflective vests are already common. These are commonly worn by construction site workers. In some countries, it is a duty to carry a set of reflective vests in the vehicle to be worn in case of leaving the vehicle in case of an emergency breakdown. One example of the reflective elements pattern on such a reflective vest is shown in FIGS. 4A and 4B. The variance of shapes and pattern of the reflective elements is quite limited. The system of the present invention may store datasets of the whole or at least the most of these commonly known, already existing (design-) patterns. Then, when one of the stored patterns is determined to be present within the field of view of the vehicle camera, the system may readily identify the pattern as being indicative of a person wearing such a vest, whereby the system may generate an alert or warning or may act upon such identification.

Figure 5:
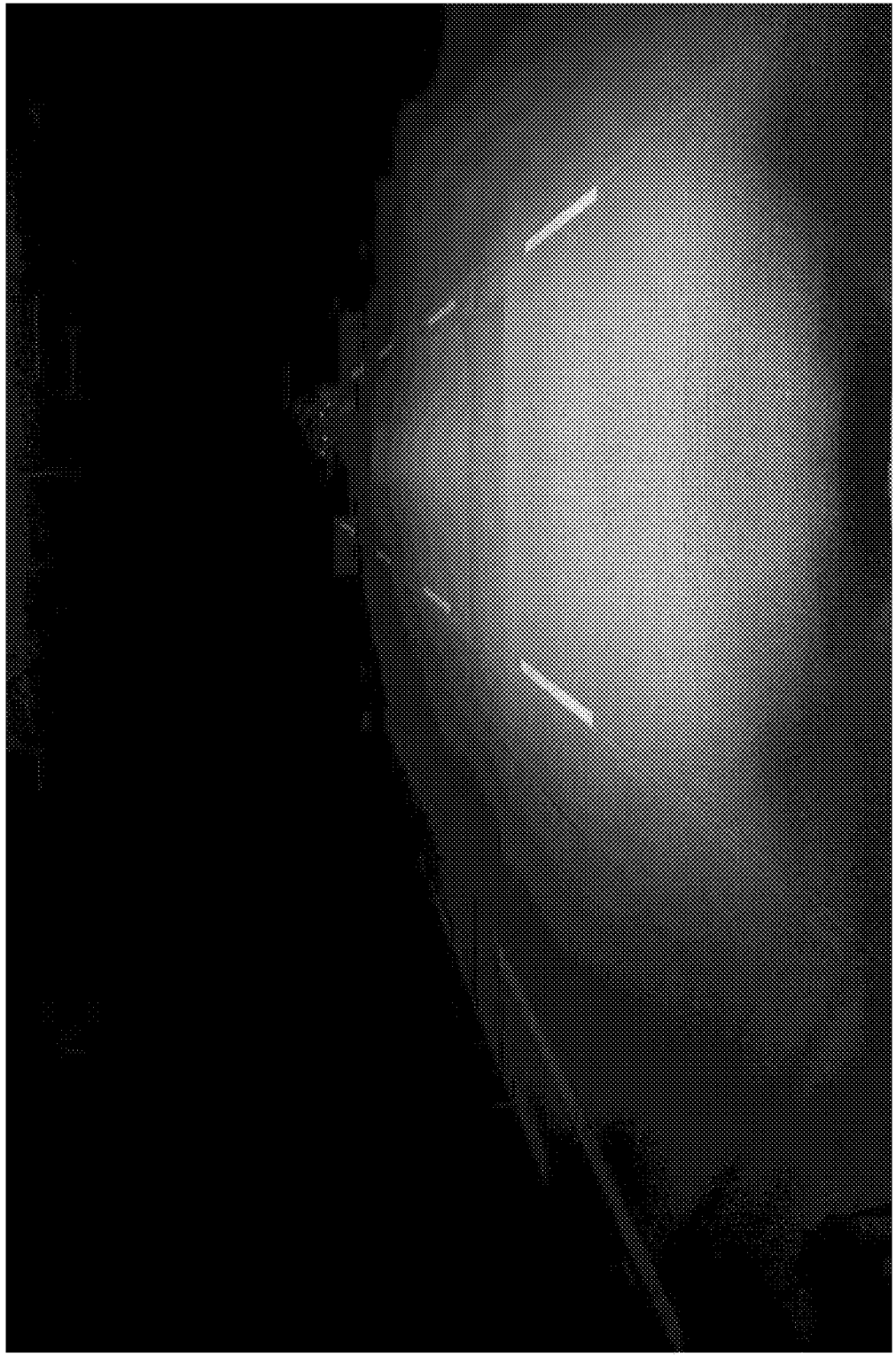
FIG. 5 is an image of a night time road scene ahead of a vehicle equipped with the vision system of the present invention, showing spoke reflectors of a bicycle ahead of the vehicle.

The system of the present invention may additionally be able to conclude out of a comparably limited coding of a pattern whether or not that pattern may belong to a specified item or person. For example, the system may be able to conclude that a reflective pattern is one reflected by common known bicycle spoke reflectors, so called cat eyes. For coming to that assumption, the distance and size of the reflective shape may be regarded. As an additional aspect of the present invention, the way that the pattern shape moves, turns or changes may also be a hints for concluding that the pattern is part of or on a person or item. FIG. 5 shows the light pattern of cat eye spoke reflectors mounted on a bicycle's two tires, with two reflectors on each tire. By that figure it becomes obvious that the reflectors are indicative of a bicycle, even though the shape of the bicycle or its rider is still not visible to the human eye or the vision system's camera because the headlamps well illuminated range ends before the position of the bicycle. The rest or stray light of the headlamps is still strong enough to be visible in the cat eye reflectors (both for a human eye and a vision system's camera). Optionally, the system may use night vision systems, which may illuminate the space ahead the vehicle with infrared (IR) (or other invisible wavelengths or spectral bands of light, such as ultra violet UV) head lamps or IR flashes or IR Laser patterns, which may highlight or illuminate the shape of a bicycle rider or pedestrian as an additional redundant image cue.

Figure 6A:
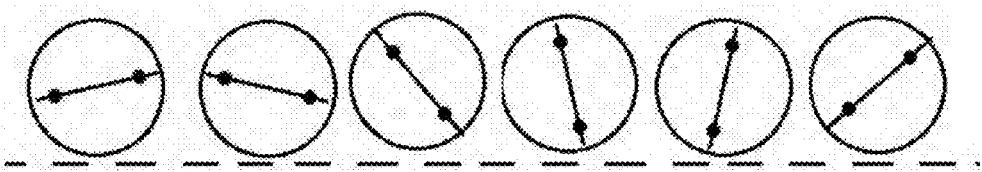
FIGS. 6A-G are patterns that may be traversed by reflectors on bicycle spokes as the bicycle moves across the field of view of the camera.
Figure 6B:
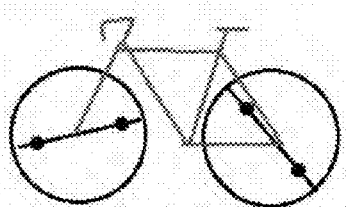
Figure 6C:
Figure 6D:
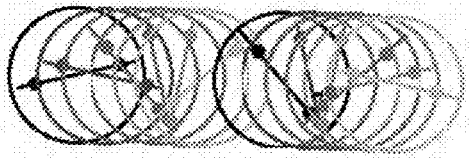

When the bicycle with two reflectors on each of its two tires (such as shown in FIGS. 5 and 6B) is in motion, so rolling over ground, each of these pairs of reflectors are circling relative to one another such as can be seen in FIG. 6A and during traversing at the same time such as can be seen in FIG. 6D.

The motion is described by:

$$x(t) = \int_{t_e}^{t_J} v(t)dt + x_0 + \sin\left(\int_{t_0}^{t_J} \frac{v(t)}{r} dt + \varphi_0\right);$$

$$y(t) = r - \cos\left(\int_{t_0}^{t_J} \frac{v(t)}{r} dt + \varphi_0\right);$$

and $$P = \left(\frac{x(t)}{y(t)}\right).$$

Figure 6E:
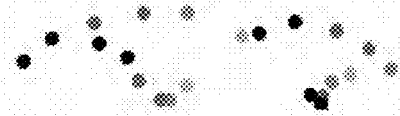
Figure 6F:
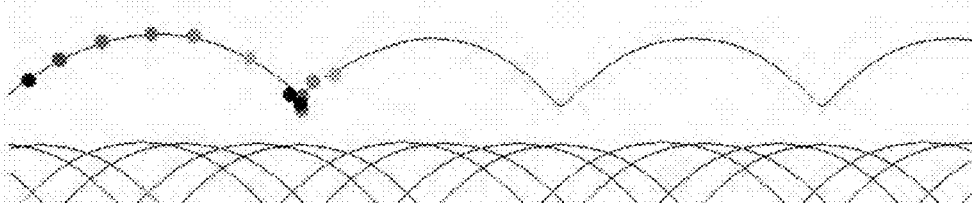
Figure 6G:
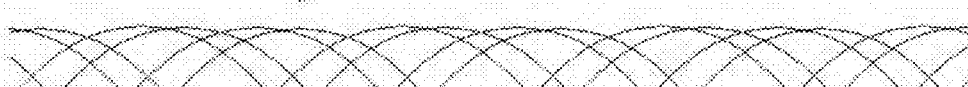
Figure 7A:
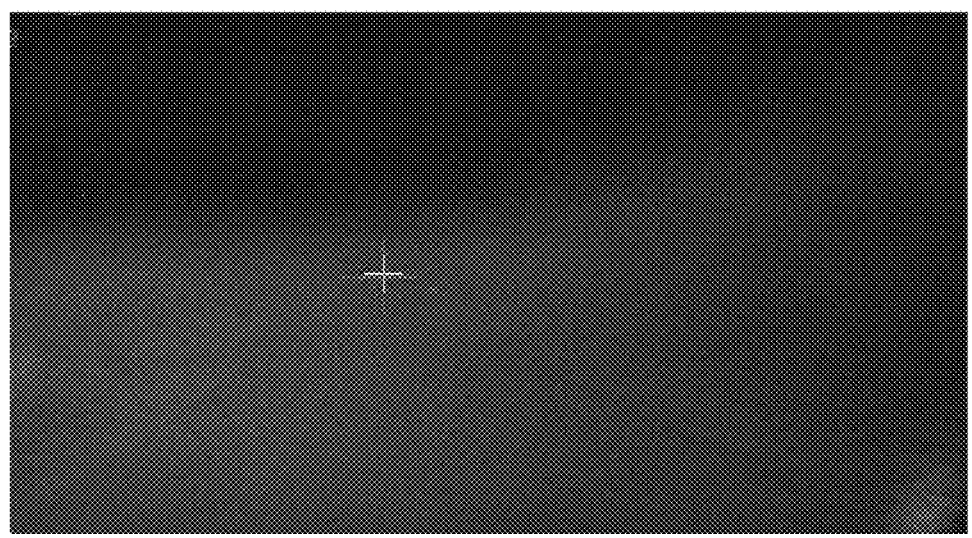
FIGS. 7A-D show a forward camera view image flow as captured, where the vehicle at which the camera is installed is following a straight road at night time with bare ambient light, and where the vehicle is approaching from the rear of a pedestrian or student who is wearing a satchel with a pattern of retroreflective reflectors or passively reflecting elements on it, with FIGS. 7A-D consecutively approaching the student from A to D.
Figure 7B:
Figure 7C:
Figure 7D:
Figure 8A:
FIGS. 8A-D show a hazard warning highlighting around a pedestrian's or student's satchel's reflector pattern, such as shown in FIGS. 3A-C, in accordance with the present invention.
Figure 8B:
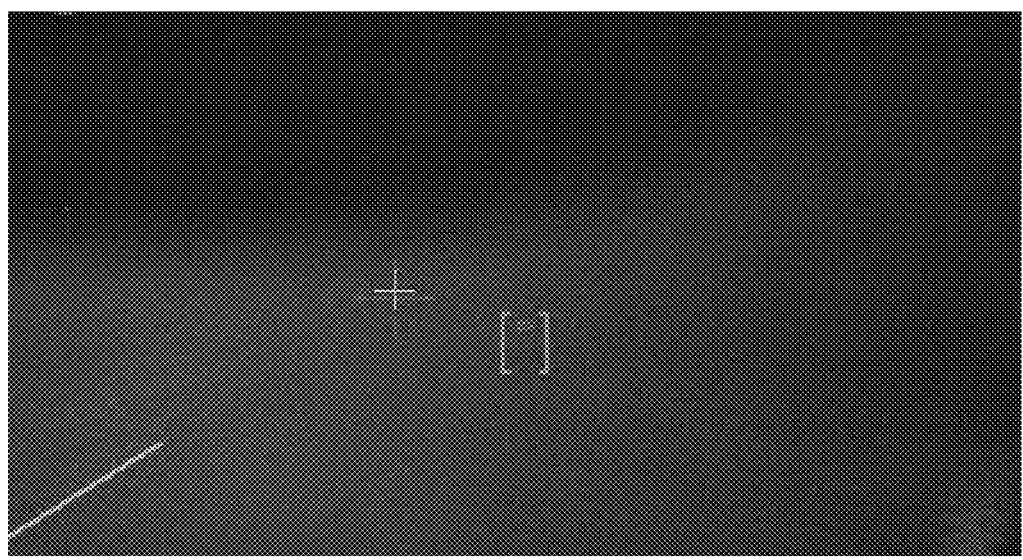
Figure 8C:
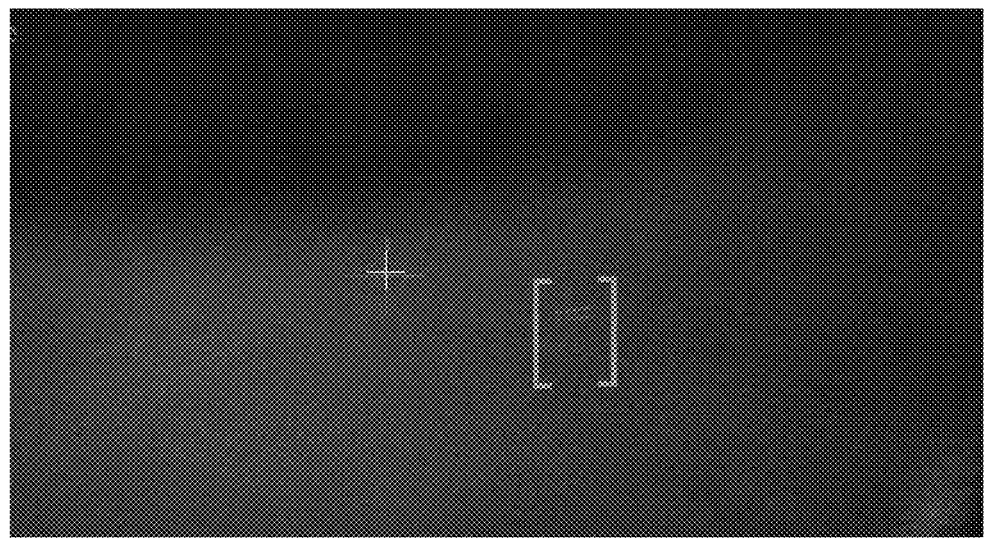
Figure 8D:

At low illumination levels such as shown in FIG. 5, only the cat eye reflectors may be visible (with the rider and the rest of the bicycle and its wheels not visible) such as can be seen in FIG. 6C. For a following viewer, these four reflectors describe four circles following one another, for a stand still viewer the x component has an additional offset equating to the bicycle's speed over the ground, see FIGS. 6E, 6F and 6G. When the reflectors are mounted orthogonally (as shown in FIG. 6A), the phase difference is Tr. The bicycle's wheels have typically substantially the same speed when driven straight (see FIG. 6D), and by that the phase shift stays comparably identical when watched for a comparably short time, such as can be seen in FIG. 6G. The (steady) phase shift between both wheels is naturally between 0 and 2π.

A change of phase shift may be indicative of the cyclist driving along a curve. The above may be similar when it comes to detecting horse shoe reflectors in motion flow by the horses' gaits' typical motion patterns (the detection may discriminate the step of leg 1,2,3,4,1,2,3,4, etc. in stepping, or in galloping 1,2,4,3, airtime, 1,2 4,3, airtime, etc.). This may apply also to joggers (reflection bouncing) and running dogs (reflection bouncing or galloping) or to a person or a student or pupil walking (reflections or reflectors or the reflectors of a satchel waving sidewards). Optionally, all of these road participants may also wear active light elements, which movements may also be discriminated as characterizing a specific moving object, person or animal. An advanced system according to the present invention may not just analyze or classify one frame whether or not a reflection light pattern may belong to a dedicated object, but a sequence of consecutive frames. Optionally, the system may be able to work the other way around by sorting out light reflections which definitely do not belong to a dedicated object. This may optionally be done in a prior stage to reduce the number of reflective light spot candidates which may be considered for being classified as a dedicated object. As shown in the examples of FIGS. 5 to 6G, some objects' reflective patterns may vary in shape and position in a known (substantially self-equal) manner and sufficiently different to another in different contexts. The system of the present invention may compare a current set of consecutive frames or the pattern changes with known or prior learned or trained sequences and may dedicate (classifying, grouping) these to objects of interest. Optionally, a prior stage may depart the reflective points which are in motion from those which are fixed. The ego motion of the ego vehicle may be considered. That may be done in a way of scene detection such as by utilizing aspects of the systems described in U.S. patent application Ser. No. 14/726,906, filed Jun. 1, 2015 and published as U.S. Publication No. US-2015-0344028, which is hereby incorporated herein by reference in its entirety. The system may use a night vision enhancement by using a visual system controlled light control, such as by utilizing aspects of the systems described in the above incorporated U.S. provisional application Ser. No. 62/222, 268.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or capacitive sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 201 2/1 581 67; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
a camera configured to be disposed at a vehicle so as to have a field of view exterior of the vehicle;
wherein said camera comprises a pixelated imaging array having a plurality of photosensing elements;
an image processor operable to process image data captured by said camera when said camera is disposed at the vehicle;
wherein, with said camera disposed at the vehicle, said image processor is operable to process captured image data to determine a pattern of retroreflective reflectors present in the field of view of said camera;
wherein said image processor compares a determined pattern of retroreflective reflectors to a database of patterns and classifies retroreflective reflectors at least in part responsive to determination that the determined pattern of retroreflective reflectors generally match a pattern of the database; and
wherein the pattern of retroreflective reflectors comprises a first coding in gray shading and a second coding in color, and wherein a prioritized first set of data is encoded to the gray shading and a lower prioritized second set of data is encoded to the color.

2. The vision system of claim 1, wherein said image processor compares movement of the determined pattern of retroreflective reflectors over multiple frames of captured image data to the database and classifies the determined pattern of retroreflective reflectors at least in part responsive to determination that the movement of the determined pattern of retroreflective reflectors generally matches the database.

3. The vision system of claim 2, wherein said image processor is operable to determine that the determined movement of the pattern of retroreflective reflectors is indicative of movement of reflectors on a wheel of a moving bicycle.

4. The vision system of claim 1, wherein the database of patterns includes at least one of (i) a pattern of reflectors on an article carried by a pedestrian and (ii) a pattern of reflectors on an article worn by a pedestrian.

5. The vision system of claim 1, wherein the database of patterns includes a spacing pattern of spaced apart reflectors along a road infrastructure.

6. The vision system of claim 1, wherein the database of patterns includes two dimensional codes.

7. The vision system of claim 1, wherein the database of patterns includes bar codes.

8. The vision system of claim 1, wherein the database of patterns includes location information.

9. The vision system of claim 1, wherein the retroreflective reflectors reflect near infrared light and wherein said camera is sensitive to near infrared light.

10. The vision system of claim 9, comprising a near infrared light source disposed at the vehicle, wherein said camera is disposed at or near said near infrared light source.

11. The vision system of claim 9, wherein the near infrared light reflecting retroreflective reflectors are disposed at a traffic sign and wherein traffic sign information of the traffic sign is visible to the driver of the vehicle in visible light.

12. The vision system of claim 1, wherein image data captured by said camera is processed to determine the first and second codings and to extract information associated with respective ones of the first and second codings.

13. A vision system of a vehicle, said vision system comprising:
a camera configured to be disposed at a vehicle so as to have a field of view exterior of the vehicle;
wherein said camera comprises a pixelated imaging array having a plurality of photosensing elements;
an image processor operable to process image data captured by said camera when said camera is disposed at the vehicle;
wherein, with said camera disposed at the vehicle and when a headlight of the vehicle is activated to emit visible light forward of the vehicle, said image processor is operable to process captured image data to determine a pattern of retroreflective reflectors present in the field of view of said camera;
wherein said image processor compares a determined pattern of retroreflective reflectors to a database of patterns and classifies retroreflective reflectors at least in part responsive to determination that the determined pattern of retroreflective reflectors generally match a pattern of the database;
wherein the pattern of retroreflective reflectors comprises a first coding pattern and a second coding pattern;
wherein image data captured by said camera is processed to determine the first and second coding patterns and to extract information associated with respective ones of the first and second coding patterns; and
wherein the first coding pattern comprises gray shading and the second coding pattern comprises color, and wherein a prioritized first set of data is encoded to the gray shading and a lower prioritized second set of data is encoded to the color.

14. The vision system of claim 13, wherein said image processor compares movement of the determined pattern of retroreflective reflectors over multiple frames of captured image data to the database and classifies the determined pattern of retroreflective reflectors at least in part responsive to determination that the movement of the determined pattern of retroreflective reflectors generally matches the database.

15. The vision system of claim 13, wherein the database of patterns includes a spacing pattern of spaced apart reflectors along a road infrastructure.

16. The vision system of claim 13, wherein the database of patterns includes at least one of (i) two dimensional codes and (ii) bar codes.

17. A vision system of a vehicle, said vision system comprising:
a camera configured to be disposed at a vehicle so as to have a field of view exterior of the vehicle;
wherein said camera comprises a pixelated imaging array having a plurality of photosensing elements;
a near infrared light source disposed at the vehicle, wherein said camera is disposed at or near said near infrared light source and wherein said camera is sensitive to near infrared light;
an image processor operable to process image data captured by said camera when said camera is disposed at the vehicle;
wherein, with said camera disposed at the vehicle and when said near infrared light source is activated, said image processor is operable to process captured image data to determine a pattern of retroreflective reflectors present in the field of view of said camera;
wherein the pattern of retroreflective reflectors comprises a first portion having a first coding pattern and a second portion having a second coding pattern;
wherein the first portion of the retroreflective reflectors reflect near infrared light;
wherein the second portion of the retroreflective reflectors reflect visible light;
wherein said image processor compares a determined pattern of retroreflective reflectors to a database of patterns and classifies retroreflective reflectors at least in part responsive to determination that the determined pattern of retroreflective reflectors generally match a pattern of the database;
wherein the retroreflective reflectors are disposed at a traffic sign and wherein traffic sign information of the traffic sign is visible to the driver of the vehicle in visible light;
wherein image data captured by said camera is processed to determine the first and second coding patterns and to extract information associated with respective ones of the first and second coding patterns; and
wherein the first coding pattern comprises gray shading and the second coding pattern comprises color, and wherein a prioritized first set of data is encoded to the gray shading and a lower prioritized second set of data is encoded to the color.

18. The vision system of claim 17, wherein the database of patterns includes at least one of (i) two dimensional codes and (ii) bar codes.

* * * * *

UNITED STATES PATENT AND TRADEMARK OFFICE
CERTIFICATE OF CORRECTION

PATENT NO. : 10,043,091 B2
APPLICATION NO. : 14/957707
DATED : August 7, 2018
INVENTOR(S) : Harjeet Singh et al.

It is certified that error appears in the above-identified patent and that said Letters Patent is hereby corrected as shown below:

In the Specification

Column 9
Lines 37-39, the formula

" $$x(t) = \int_{t_e}^{tJ} v(t)dt + x_0 + \sin\left(\int_{t_o}^{tJ} \frac{v(t)}{r} dt + \varphi_0\right);$$ " should be -- $$x(t) = \int_{t_o}^{tJ} v(t)dt + x_0 + \sin\left(\int_{t_o}^{tJ} \frac{v(t)}{r} dt + \varphi_0\right);$$ --

Line 55, "Tr" should be --π--

Column 11
Line 36, "WO201 2/1 581 67" should be --WO2012/158167--

Signed and Sealed this
Sixth Day of November, 2018

Andrei Iancu
*Director of the United States Patent and Trademark Office*